United States Patent
Howell (10) Patent No.: US 10,289,346 B2
(45) Date of Patent: May 14, 2019

(54) APPARATUS PROVIDING WIRELESS ACCESS TO STORAGE DEVICES

(71) Applicant: Saul B. Troen, New York, NY (US)

(72) Inventor: Christopher Howell, Putnam Valley, NY (US)

( * ) Notice: Subject to any disclaimer, the term of this patent is extended or adjusted under 35 U.S.C. 154(b) by 310 days.

(21) Appl. No.: 14/490,903

(22) Filed: Sep. 19, 2014

(65) Prior Publication Data

US 2016/0085482 A1 Mar. 24, 2016

(51) Int. Cl.
*G06F 3/06* (2006.01)
*H04B 1/38* (2015.01)
*G06F 13/12* (2006.01)

(52) U.S. Cl.
CPC ............ *G06F 3/067* (2013.01); *G06F 3/0622* (2013.01); *G06F 3/0637* (2013.01); *G06F 3/0679* (2013.01); *G06F 13/128* (2013.01); *H04B 1/38* (2013.01)

(58) Field of Classification Search
CPC ........ G06F 3/067; G06F 3/0683; G06F 13/38; G06F 13/4004; G06F 13/4009; G06F 13/4027; G06F 13/4063; G06F 17/30; G06F 17/30002; G06F 17/30005; G06F 17/30861; G06F 17/30896; G06F 3/0622; G06F 3/0637; G06F 3/0679; H04B 1/38
See application file for complete search history.

(56) References Cited

U.S. PATENT DOCUMENTS

| 6,003,047 | A | * | 12/1999 | Osmond | ................. H04L 41/22 |
|---|---|---|---|---|---|
|  |  |  |  |  | 715/210 |
| 6,522,552 | B1 |  | 2/2003 | Lee |  |
| 8,606,880 | B2 |  | 12/2013 | Tsao |  |
| 2004/0219949 | A1 |  | 11/2004 | Su et al. |  |
| 2007/0094369 | A1 | * | 4/2007 | Hanes | ..................... G11B 33/10 |
|  |  |  |  |  | 709/223 |
| 2007/0294457 | A1 |  | 12/2007 | Gantman |  |
| 2008/0270565 | A1 | * | 10/2008 | Gray | ..................... G06F 3/0607 |
|  |  |  |  |  | 709/213 |
| 2008/0270631 | A1 | * | 10/2008 | Thomas | .............. H04L 67/1097 |
|  |  |  |  |  | 710/2 |
| 2010/0131687 | A1 |  | 5/2010 | Li |  |

(Continued)

OTHER PUBLICATIONS

Wang, Shuangbao (Paul), et al. "Computer Architecture and Security: Fundamentals of Designing Secure Computer Systems". 2013. Higher Education Press. John Wiley & Sons Singapre Pte. Ltd. ISBN 978-1-118-16881-3. Sections 5.4.2-5.4.4.*

(Continued)

*Primary Examiner* — Thomas J Cleary
(74) *Attorney, Agent, or Firm* — Cittone Demers & Ameri LLP; James P. Demers (57) ABSTRACT

The invention provides methods and apparatus for the reading of data from digital memory devices, and methods and apparatus for the wireless transmittal of the data to computing devices. The apparatus combines hardware and software to serve files from the memory device to any web-capable computing device, such as a portable computer, tablet, or smart phone, by creating HTML wrappers around the files and directories on the memory device. The data is presented to the computing devices in a secure manner, through the agency of a web browser running on each device.

4 Claims, 5 Drawing Sheets

(56) References Cited

U.S. PATENT DOCUMENTS

| | | | |
|---|---|---|---|
| 2011/0137974 A1* | 6/2011 | Momchilov | G06F 9/54 |
| | | | 709/202 |
| 2012/0075667 A1* | 3/2012 | Kamata | H04L 67/1097 |
| | | | 358/1.15 |
| 2013/0268758 A1 | 10/2013 | Schrecker | |
| 2015/0082457 A1* | 3/2015 | Nakamura | H04L 63/10 |
| | | | 726/27 |
| 2015/0116522 A1* | 4/2015 | Tsunoda | H04N 9/8042 |
| | | | 348/211.2 |
| 2016/0004644 A1* | 1/2016 | Samanta | G06F 12/0891 |
| | | | 711/3 |

OTHER PUBLICATIONS

Patkar, Mihir. "How Can I Add Wi-Fi to a Desktop PC?" Lifehacker. Online Apr. 29, 2014. Retrieved from Internet Oct. 23, 2017. <https://lifehacker.com/how-can-i-add-wi-fi-to-a-desktop-pc-1569231692>.*

Murphy, David. "The Desktop Wireless Adapter Difference: USB vs. PCI". PC World. Online Nov. 7, 2011. Retrieved from Internet Oct. 23, 2017. <https://www.pcworld.com/article/243226/the_desktop_wireless_adapter_difference_usb_vs_pci.html>.*

Mujtaba, Hassan. "Zotac announces new H55-ITX WiFi motherboard." WCCFtech. Online Aug. 12, 2010. Retrieved from Internet Oct. 23, 2017. <http://wccftech.com/zotac-announces-h55itx-wifi-motherboard>.*

Sales brochure for Kingston "MobileLite Wireless G2" device. Downloaded Jul. 10, 2014.

Sales brochure for HooToo "TripMade Nano" device. Downloaded Sep. 22, 2014.

\* cited by examiner

APPARATUS PROVIDING WIRELESS ACCESS TO STORAGE DEVICES

FIELD OF THE INVENTION

The present invention relates to the reading of digital memory devices, such as flash, magnetic disk, and optical disk devices, and to the wireless transmittal of data read from such devices.

BACKGROUND OF THE INVENTION

U.S. Pat. No. 6,522,552 describes a wireless memory card reader configured to read flash memory via a USB controller, which delivers the USB-formatted data to a computer via a Bluetooth™ wireless connection. The data is received by a Bluetooth™ receiver attached to a USB port on the receiving computer.

U.S. Pat. No. 8,606,880 describes methods for the partition of a large external storage device into a large number of small volumes, and for management of the volumes so as to permit each of them to serve as a virtual storage medium ("cloud storage") for an individual wireless device such as a smart phone or tablet.

United States Patent Application publication No. 2003/0191716 describes methods allowing individual users to encrypt and decrypt data files stored on a central server.

United States Patent Application publication No. 2004/0219949 describes methods and apparatus for the short-range (e.g. WiFi and Bluetooth™) wireless transfer of data from a mobile device memory to an external (backup) storage medium.

United States Patent Application publication No. 2010/0217871 likewise describes methods and apparatus for the wireless transfer of data between mobile device memory and external storage media, employing long-range wireless communication protocols. The method permits the mobile device memory to be mounted as a shared network drive.

United States Patent Application Publication No. 2010/0131687 describes a wireless remote USB hub apparatus; the device is essentially a Wi-Fi router having one or more USB ports for external drives, printers and the like, making the devices accessible to personal computers or other client devices via the wireless network.

Most of the prior art methods and apparatus require complex systems and dedicated hardware. Simple devices, such as the wireless card reader of U.S. Pat. No. 6,522,552, may offer controlled access to the stored data simply by virtue of the wireless network protocol, but otherwise lack security features such a copy protection. There remains a need for controlled, secure wireless access to external and/or portable data storage devices that is inexpensive and convenient for non-expert consumers.

SUMMARY OF THE INVENTION

The present invention is a wireless reader for storage devices, including but not limited to SD cards and CF and USB flash drives. The reader provides one or more sockets configured to physically connect with the storage devices, and one or more controllers programmed to utilize the appropriate interface protocol to mount the device, and to identify and read the files stored on the device. The reader also provides one or more wireless transceivers, such as Wi-Fi or Bluetooth™ transceivers, and a processor programmed to control and utilize the transceiver(s) so as to transmit the storage device file directory, and the files themselves, to a computer which is in wireless communication with the reader.

In preferred embodiments, the storage device is a solid-state USB flash drive.

In preferred embodiments, the file directories and the files are provided with HTML wrappers prior to being transmitted, and the file contents are processed by helper programs and displayed on the receiving computer within a browser window.

In preferred embodiments, the file contents are made available to a plurality of computers, and an operator of the reader is provided with monitoring and control capabilities over the reading and transmission of the files to the individual computers.

The apparatus of the invention thus allows the creation of a local, private, self-contained, password-protected multi-user wireless network, inaccessible from any other location, based on the files contained in the mounted storage device. Directories of files located on the storage device are presented as web pages, with links to the actual files, and with HTML wrappers for direct playback where needed. Thus, any web-capable device may be used to view and access the files, without the need to install software specific to the present invention.

In broad terms, the invention provides a device for wirelessly transmitting file directory entries and data files read from a storage device, comprising: (a) a socket for physically and electrically connecting the storage device; (b) a host interface controller for mounting and reading the storage device; (c) a processor programmed to attach HTML wrapper code to file directory entries and data files read from the storage device; (d) a wireless protocol controller for transmitting the file directories and data files together with their HTML wrapper codes to a wireless transceiver; and (e) a wireless transceiver.

In a preferred embodiment, the invention provides a device having the same features, but further comprising features that provide for writing data to a second storage device. In this embodiment, a device of the invention comprises: (a) a first socket for physically and electrically connecting a first storage device; (b) a second socket for physically and electrically connecting a second storage device; (c) a host interface controller for mounting and reading the first storage device; (d) a host interface controller for mounting and reading the second storage device; (e) a processor programmed to attach HTML wrapper code to file directory entries and data files read from the first storage device, and further programmed to write incoming data files to the second storage device; (f) a wireless protocol controller for transmitting the file directory entries and data files, together with their HTML wrapper codes, to a wireless transceiver, and further programmed to decode incoming data received from the wireless transceiver; and (g) a wireless transceiver.

DETAILED DESCRIPTION OF PREFERRED EMBODIMENTS

As used herein, the term "reader" refers to a device of the invention which incorporates (1) one or more physical sockets or other means of electrical communication with a storage device, (2) one or more wireless transceivers, and (3) one or more processors serving as controllers, translators and servers for the storage device interface and the wireless tranceiver(s). Preferably the device incorporates a processor programmed to generate and serve HTML wrappers for the files on the storage device.

A reader of the invention is special-purpose computer, which is small, lightweight, and much less expensive than a general-purpose computer that might be configured to carry out the same or similar tasks. In particular, the preferred embodiments of the invention are not configured to load and execute programs, other than whatever software has been embedded into the device by "flashing" nonvolatile memory. Preferred embodiments have no video display, and thus no need for the graphics controller board and power supply associated with a video computer display. Although a small display could be incorporated if desired, the state of the device (powered, reading, writing, etc.) is adequately, and preferably, conveyed by LEDs. Preferred embodiments of the invention also have neither hard drives nor SSD drives, nor the associated power supplies and control boards, but have instead ports for removable storage devices.

A removable storage device may be an optical or magnetic disk drive, a magnetic tape drive, or preferably a solid state memory device, including but not limited to SSD, CF, SD, or USB flash drives. Most preferably, the storage device is a USB flash drive.

The reader will incorporate controller software appropriate to the removable storage device(s) that the reader is designed to attach to. For example, an SSD device will likely require a SATA or eSATA connector and controller, while a USB device will require a USB connector and controller. USB adaptors for CF and SD cards are well-known, and such adaptors will permit the use of these devices via a USB connector on the reader.

The wireless transceiver may employ Bluetooth™ technology, but will preferably utilize longer-range technologies, such as those employing the WiMAX or Wi-Fi protocols. Wi-Fi is particularly preferred, for which any of the now-existing or future-developed Wi-Fi (802.11) standards may be employed.

USB may refer to any of the presently recognized or future-developed USB protocols, such as USB 1.0, USB 2.0, or USB 3.0, and the physical connector(s) on the reader may be any of the recognized standard USB connectors, for example, USB "Type A", "Type B", "Type C", mini-USB, or micro-USB, or any future-developed connector that may be certified for use with the USB protocol.

Users of the reader include individuals who access the contents of the storage device though browsers running on their computers. These individuals are referred to herein as "viewers". The term "computer", as used in connection with viewers, refers to desktop, portable, laptop, notebook, and tablet computers, and in some cases may include smart phones and so-called "phablets". In general, any device capable of running an internet browser, and having appropriate helper programs for the file types being viewed, is a "computer" for purposes of viewers' access. In some embodiments of the invention, another type of user is the person who provides the storage device and the files stored thereon, for use by one or more viewers. This individual is referred to herein as the "owner". Examples of an owner are a teacher providing instructional materials to students, and a speaker making a presentation to an audience. (The students, and the audience, are viewers of the owner's files.)

HTML "wrapper" software, running on a processor of the reader, examines the directory (or directories) of files on an attached storage device, and creates for each file a link to an appropriate local helper program, as determined by looking up the file type in a local table. This table is preferably stored in memory on the reader. In certain embodiments, the reader may employ "User Agent Sniffing" to identify the browser and platform the information is being delivered to, in order to determine the capabilities of the viewer's platform and select appropriate helper programs.

By way of example, if the reader is displaying a directory on the storage device that contains a graphics file (e.g., "picture.jpg") and a video file (e.g., "vid.mp4"), the wrapper program may output the following HTML:

<a href="PictViewer.php?f=picture.jpg>picture.jpg</a>
<a href="VideoViewer.php?f=vid.mp4>vid.mp4</a>

The HTML links are displayed on the viewer's computer via the viewer's choice of browser software (e.g., Internet Explorer™, Safari™, Firefox™, Chrome™ or the like), where the displayed links serve as a directory listing for one or more volumes on the storage device. In the example given above, the viewer would see the following in the browser window:

picture.jpg
vid.mp4

Clicking on, or otherwise selecting and opening, either link will call up the helper program (PictViewer.php or VideoViewer.php) specified by the wrapper. The helper program would read the file and display the file's contents, appropriately formatted and sized for the viewer's device. Buttons to navigate back to the directory listing will preferably be displayed as well. If the file format requires translation to be viewed on the viewer's device, the helper program will translate the file before serving it to the user. An optional DSP (digital signal processor) may be provided on the reader, which is programmed to provide a real-time streaming solution for more complex or lengthy file conversions.

For file formats not typically supported by client web browsers, the system of the invention may embed a javascript routine to handle the file, or it may convert the file on the fly to a common format, and serve the converted file. By virtue of the invention's custom transport system, all requests outside of the system can be re-directed back to the reader's login page, eliminating the possibility of reading or writing data from outside of the local network.

Figure 1:
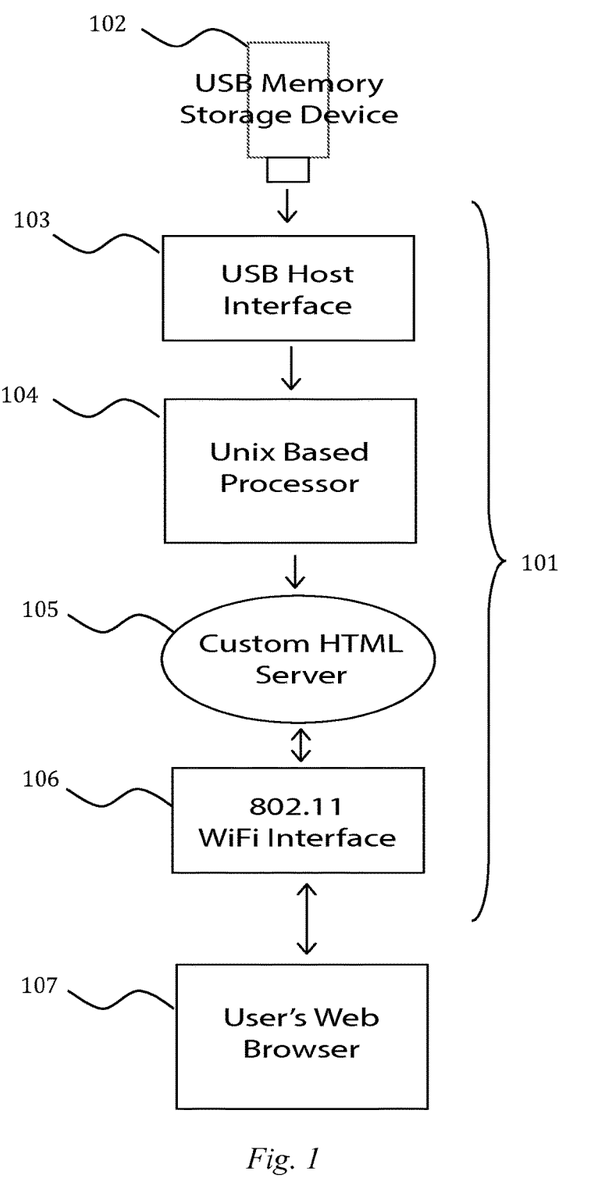
FIG. 1 shows the flow of data between a storage device, the hardware components of the invention, and the receiving computer of a viewer, in one embodiment of the invention.

Referring to FIG. 1, in one embodiment, the reader 101 comprises a host interface 103 (in the embodiment shown, a USB host interface) connected to a microprocessor 104, running the software of the invention (in the embodiment shown, under a UNIX-based operating system), and connected to the viewer's device via a wireless transceiver 106 (in the embodiment shown, an 802.11 Wi-Fi transceiver.)

The system may optionally be powered by a battery for convenience and/or for portable use. Rechargeable batteries, such as lithium-polymer batteries, are preferred, and may be connected via a charge circuit built into the reader. In use, a memory storage device 102 (in the embodiment shown, a USB memory stick) is plugged into the USB port of the host interface 103. The interface permits the processor to recognize the device 102 and read the directories and files stored thereon. The processor, via the software of the invention, generates an HTML wrapper for the files and file directory. Custom HTML server 105, which is shown separately from but runs on processor 104, delivers the resulting HTML to the wireless interface 106, which transmits the file wirelessly to the viewer's device, on which is running the viewer's browser program 107. The HTML wrapper causes the directories and files present on device 102 to be displayed in a window of the browser 107. The viewer, through the browser, can request these files and directories only via interaction with the HTML server 105.

Figure 2:
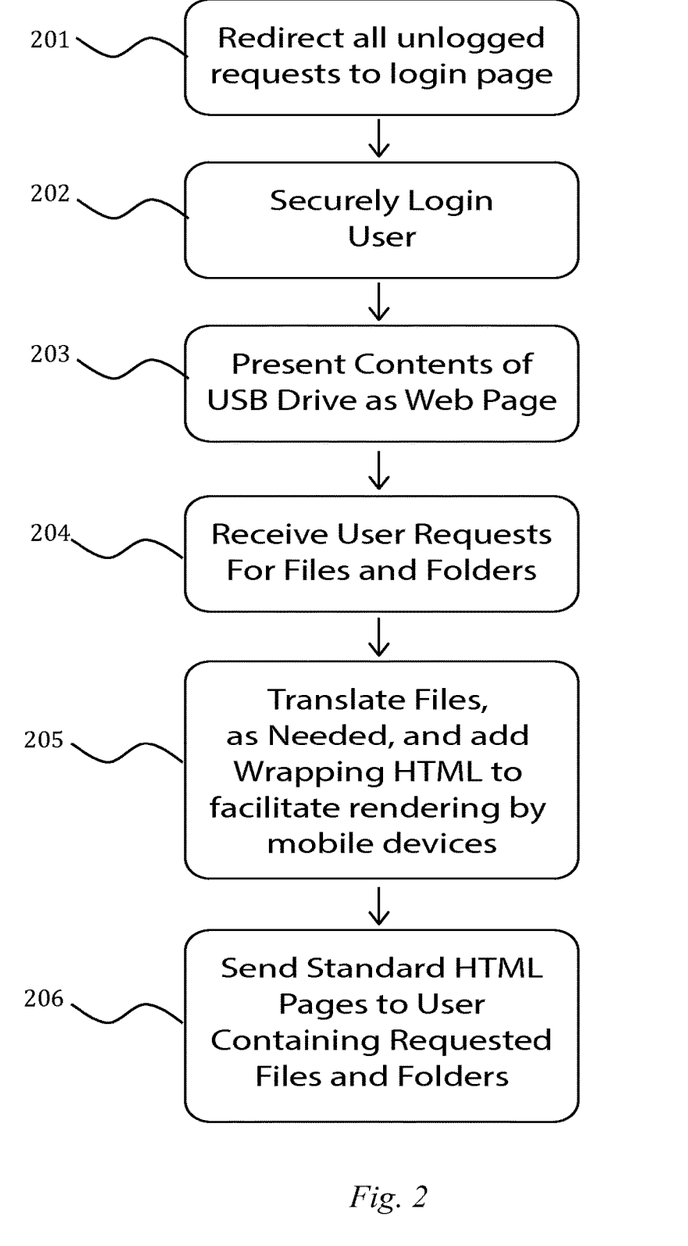
FIG. 2 is a flow chart showing the process of the invention as carried out by software, in one embodiment of the invention.

Referring to FIG. 2, the basic functions of the software of the invention are shown. At step 201, wireless requests from devices that are not logged in are directed to a login page, where user IDs, passwords, and optionally, digital security certificates are validated. Upon validation, the user is securely logged in (202). The reader then serves, at 203, the HTML-wrapped directory of the contents of the storage device, which appears as a web page in the viewer's browser. The viewer selects desired files and folders at 204. The reader, at 205, then employs translation and helper programs appropriate to the file type requested to prepare the file contents for display, and adds the necessary wrapping HTML code to enable the contents to be displayed by the viewer's browser software. Finally, at 206, the requested files are served as HTML pages, via the wireless interface, to the viewer's device. Preferably, the processor and HTML server are configured to serve files to a plurality of viewers' devices.

By the means outlined above, the software creates an encrypted network, using protocols known in the art, to which any authorized device may log in. Upon login, a viewer is directed to a home page, the contents of which are determined by the data on the storage device mounted on the reader. A directory listing of data on the storage device is presented with HTML wrapping code, so that when the files themselves are requested they are presented in a way that facilitates their being viewed in the viewer's web browser. Embedded players, helper programs, and real-time file conversion are employed as needed to deliver the requested content within a browser window.

Because the wrapper is an HTML or PHP file generated by the reader's software, it controls access to the files, shielding and preventing the viewer from dealing with the actual files. The invention instead presents the information contained in the requested files, in a form suitable for the viewer's device. As with content delivered over the Internet, consistent delivery of content is thereby made independent of the viewer's hardware and/or operating system.

The files thus presented may be provided with the same sort of security as any information presented on the Internet can have, which is to say that viewers may take "screen grabs" with their device, or even have a screen capture device that generates a video of what they are viewing. Direct copying of files, however, can be prevented, so as to limit the ability of a viewer to carry out reproduction. Furthermore, access to the reader's wireless connection can be limited by the usual Wi-Fi security provisions, passwords and encryption can be employed as with any local area network, and the operator of the reader, in certain embodiments of the invention, is provided with the ability to monitor and record connections to the system and requests for file contents.

One possible use of this embodiment of the invention is to provide a smartphone or tablet computer with access to an almost limitless library of files. HD movies, for example, can occupy several gigabytes of storage space, and it is not practical to store a collection of such movies on a portable device like a smart phone or tablet. With the recent development of terabyte USB drives, however, the present invention makes large collections of large files available for viewing on portable devices, without the need for wired connections, and without incurring data charges, or encountering the throttling of bandwidth, that are associated with data transfers over commercial wireless networks.

Another potential use is in connection with presentations at meetings, where spreadsheets, diagrams, and other visual content can be delivered to the portable devices of all persons present in a room, for the participants to view and discuss. This is of particular value for information that is not amenable to the "slide show" format of presentation software, or information which needs to be made available to participants during the course of a slide show presentation.

Figure 3:
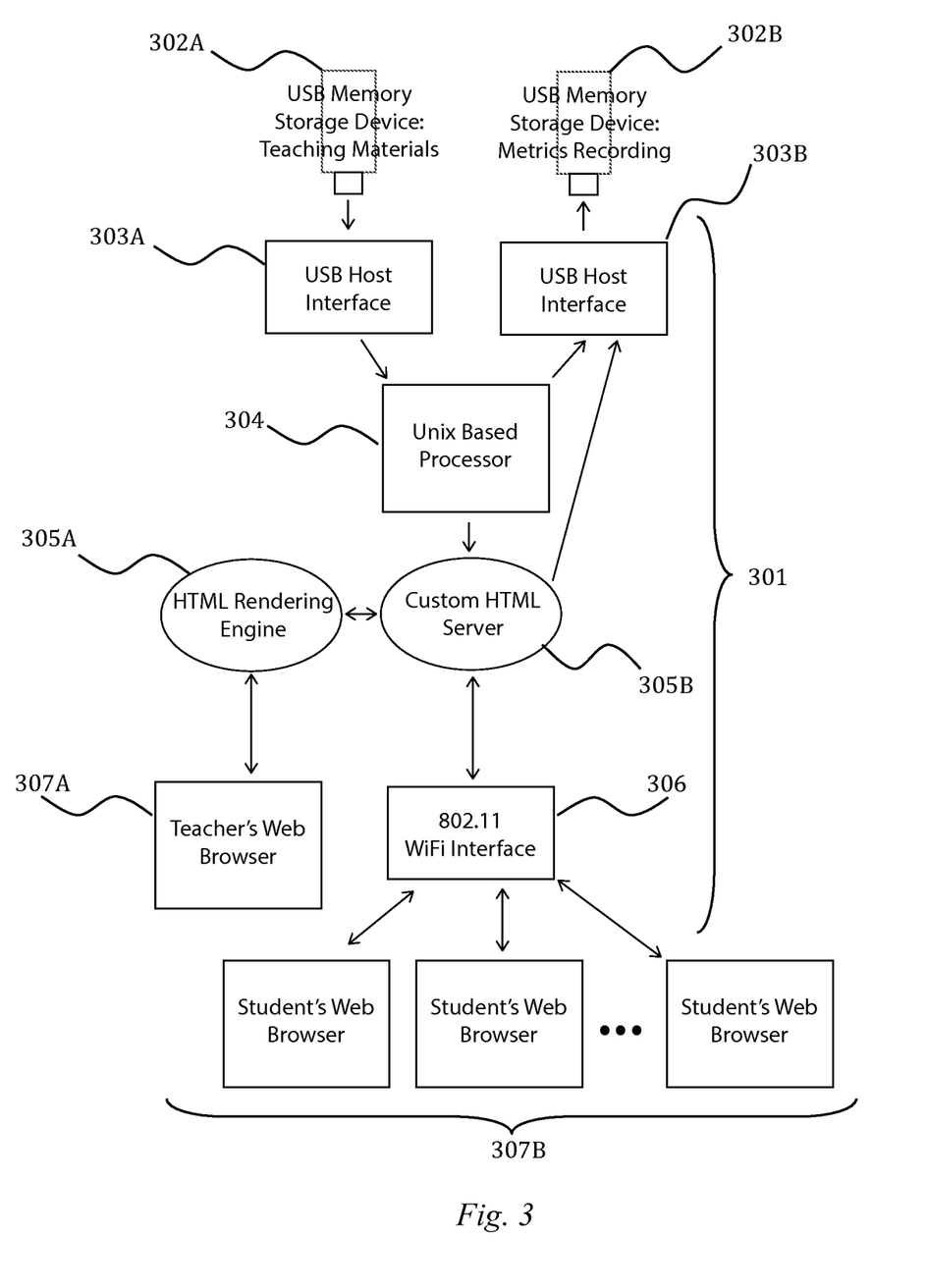
FIG. 3 shows the flow of data between storage devices, the hardware components of the invention, and the receiving computer of a plurality of viewers, in an alternative embodiment of the invention.

Referring to FIG. 3, in another embodiment of the invention, suitable for training or educational applications, the system 301 comprises two host interfaces 303A and 303B (in the embodiment shown, two USB interfaces). Interface 303A is used to provide content, such as learning materials for students, stored on memory device 302A. The content may, by way of example, take the form of text, graphics, databases, spreadsheets, presentations, video, and interactive media. Interface 303B provides access to storage device 302B where metrics, such as records of student interactions and testing results, may be stored. Both devices are controlled by custom server software 305B running on a processor 304 and controlled by the owner (in the embodiment shown, a teacher).

An HTML rendering engine 305A, also running on processor 304, provides a rendered stream of all connected viewers (students) to the teacher via the teacher's browser 307A, enabling the teacher to view or switch between mirrored outputs showing the activities within each viewer's browser. The teacher may thus look in on a number of students simultaneously, and provide assistance to students who appear to be lagging. Students, at the same time, being aware that their activities are visible to the teacher, will be more likely to remain focused on the lesson at hand. Server 305B gives the teacher read/write access to the storage device 302B via the processor 304, while giving the students direct write-only access via the host interface 303B. This arrangement conveniently and inherently provides a very high level of security.

Custom HTML server 305B also delivers HTML-wrapped content from device 302A to the wireless interface 306, which transmits the files wirelessly to one or more viewers' devices, on which are running the viewers' independent browser programs 307B. The HTML wrapper causes the directories and files present on device 302A to be displayed in a window of the browsers 307B. The viewers, through their browsers, can request these files and directories only via interaction with the HTML server 305B. The system of the present invention, in this embodiment, gives secure access to an arbitrarily large store of data, to a number of students, without burdening the school's internal or external bandwidth.

The present invention provides a self-contained network, with controlled access to all files on the mounted storage devices, therefore it provides a system that is well-suited to the administration of tests. By keeping the primary device 302A configured as read-only for student viewers, and having the secondary device 302B configured as write-only for student viewers, a high level of security is easily maintained.

Figure 4:
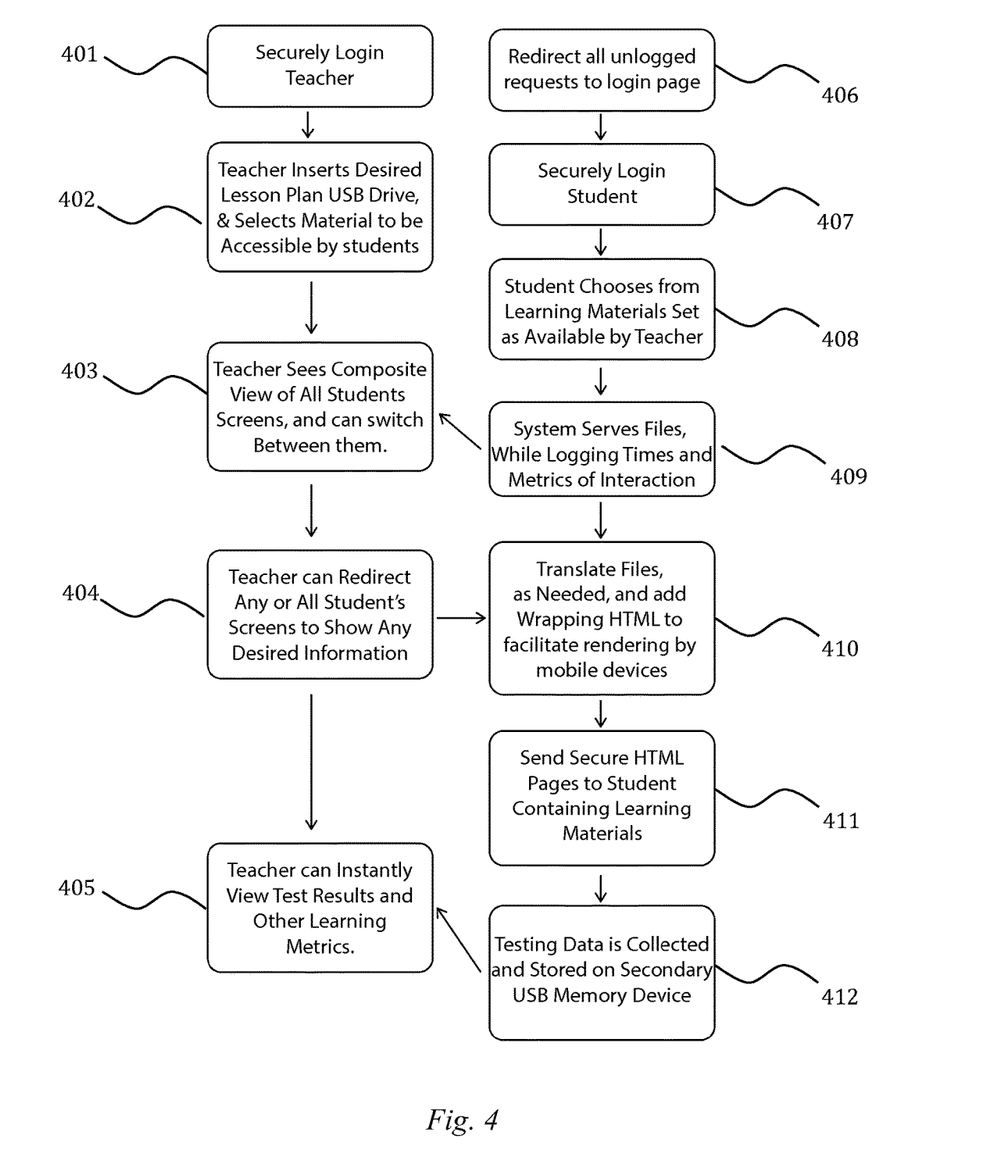
FIG. 4 is a flow chart showing the process of the invention as carried out by software, in an alternative embodiment of the invention.

Referring to FIG. 4, the custom software of the invention creates an encrypted network, which logs in the teacher at 401, and also receives requests at 406 and securely logs in the students (407). The teacher has control over what information is accessible to the students, and can customize the access for each individual student as appropriate to each student's level of progress in the course. The teacher, at 402, loads this material onto the memory device 302A Upon student login, the system directs the student to the required pages for reading or review, selected by the student at 408, or to an interactive page for test-taking. The system, in this embodiment, includes facilities for combining multiple HTML feeds into one viewable stream, for delivery to the owner/teacher.

The reader serves, at 409, the HTML-wrapped directory of the contents of the storage device, which appears as a web page in each viewer's browser, and contemporaneously records the time and/or duration of access to each served page by each student. The reader, at 410, then employs translation and helper programs appropriate to the file type requested to prepare the file contents for display, and adds the necessary wrapping HTML code to enable the contents to be displayed by the viewer's browser software. Finally, at 411, the requested files are served as HTML pages, via the wireless interface, to the viewers' devices.

The teacher's control station (in most cases, this will be the computer logged in at 401) can redirect specific students to specific screens at 404, and the teacher can highlight specific materials if he or she determines that the student is in need of such direction. Metrics specific to each student, such as test answers and time spent on each page, can be displayed for current evaluation by the teacher at 405, and/or stored at 412 for later analysis. The control station can view all student browsers simultaneously, maintaining and/or retaining mirrors of each screen as is it rendered and served to each student.

One useful application of the above embodiment is in the classroom or in a training facility, where a teacher or instructor can store instructional material on a memory device (such as a USB flash drive) and make it available to class participants in a classroom or lecture hall via a reader of the present invention. Students equipped with laptop or tablet computers running browser software are given access to the reader's wireless communication port (much as they would connect to a router), and lecture notes, illustrations, animations, and test questions can be provided in an interactive manner.

The preferred wireless protocol is Wi-Fi, as it has a range appropriate to the size of the typical classroom or lecture hall.

EXAMPLE

The circuit board in the reader may incorporate, by way of example, a standard Open-WRT CPU. An example of a reader of the present invention was contructed using a Carambola™ 2 Wi-Fi Linux module from 8 devices (Kauna, Lithuania; sold by EXP GmbH, Saarbrücken, Germany), mounted on the manufacturer's development board. The module has the following specifications:

| | |
|---|---|
| CPU | AR9331, 400 MHz |
| Memory | 16 MB Flash and 64 MB DDR2 RAM |
| Frequency | 2.4 GHz |
| Max output power | 21 dBm |
| Wireless standard | 802.11 b/g/n |
| Antenna (port) | U.FL connector |
| Power supply | 3.3 V, power consumption 0.5 W |
| Interfaces | USB host/slave, serial port, 2 × Ethernet, i2S, SLIC, SPDIF, 23 × GPIO |
| Size | 28 by 38 mm |
| Software | OpenWrt |

Figure 5:
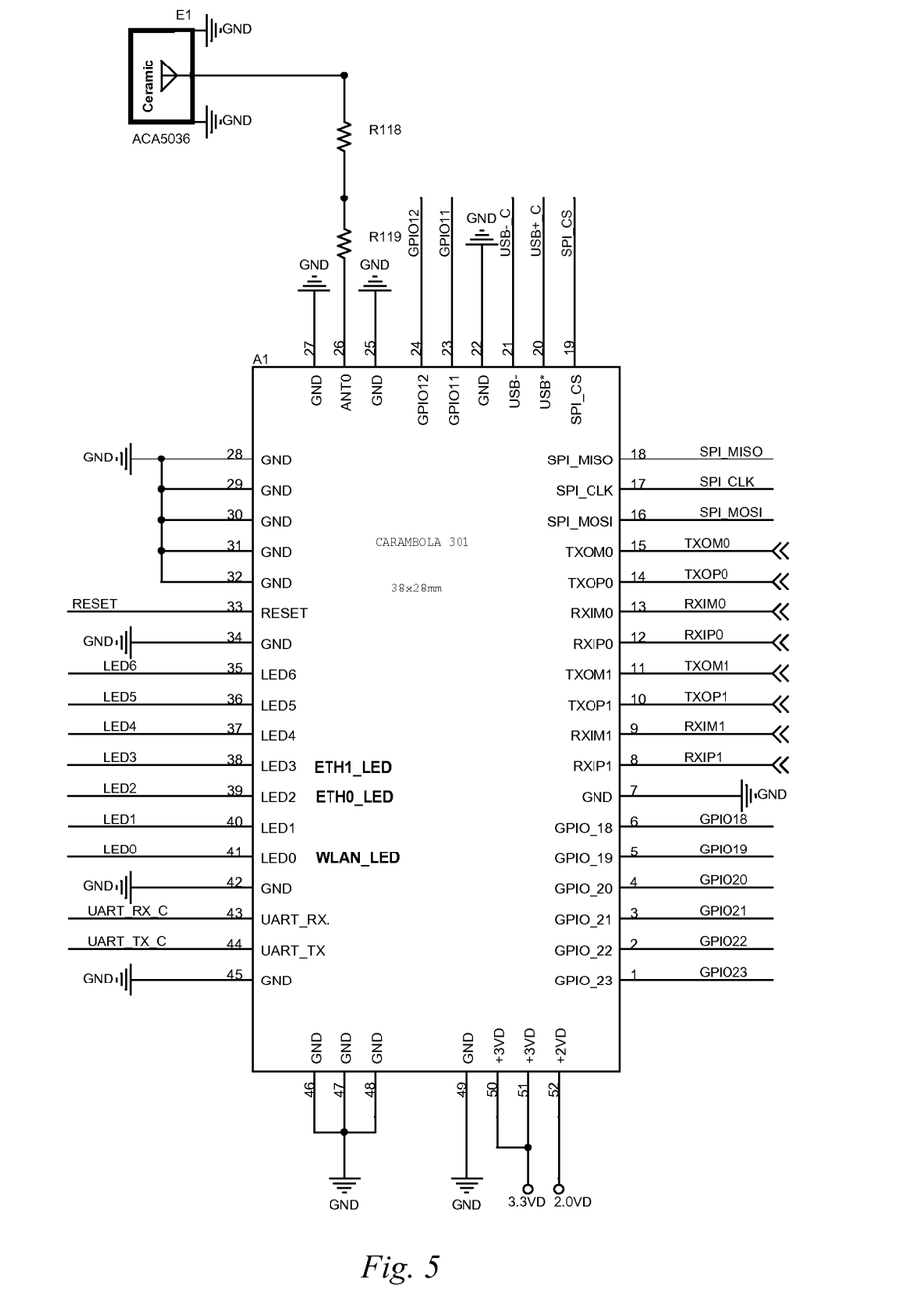
FIG. 5 is the diagram of the core portion of the circuit board used in the representative device of the example.

FIG. 5 shows the pin outputs from the processor to the development board. The development board was equipped with an integrated 2.4 GHz chip (Wi-Fi) antenna (shown), as well as ETH0 and ETH1 (Ethernet) LAN ports (not shown; pins 8-15), and Type A and Mini-A USB sockets (not shown; pins 16-21, 43 and 44).

I claim:

1. A special-purpose computer for reading file directory entries and data files from at least one storage device, and wirelessly transmitting to a user the file directory entries and the content of the data files read from the at least one storage device, comprising:
    (a) a socket for physically and electrically connecting at least one storage device;
    (b) at least one host interface controller for mounting and reading the at least one storage device;
    (c) a processor programmed to attach HTML wrapper code to file directory entries and to the content of data files read from the at least one storage device;
    (d) a Wi-Fi transceiver; and
    (e) a Wi-Fi protocol controller for transmitting the file directory entries and the content of the data files together with their HTML wrapper codes to the wireless transceiver, the controller being configured to transmit said file directory entries, content, and codes only after the user is validated via a login page, and being further configured to not transmit the data files; wherein the content of the data files is transmitted as HTML pages readable by a browser.

2. The computer according to claim 1, wherein the at least one host interface controller is a USB interface controller.

3. A special-purpose computer for reading file directory entries and data files from at least one storage device, and wirelessly transmitting to a user the file directory entries and content of the data files read from the at least one storage device computer, comprising:
    (a) a first socket for physically and electrically connecting a first storage device;
    (b) a second socket for physically and electrically connecting a second storage device;
    (c) a first host interface controller for mounting and reading the first storage device;
    (d) a second host interface controller for mounting and reading the second storage device;
    (e) a processor programmed to attach HTML wrapper code to file directory entries and to the content of data files read from the first storage device;
    (f) a Wi-Fi transceiver; and
    (g) a Wi-Fi protocol controller for transmitting the file directory entries and the content of the data files, together with their HTML wrapper codes, to the wireless transceiver, and further programmed to decode incoming data received from the wireless transceiver, the controller being configured to transmit said file directory entries, content, and codes only after the user is validated via a login page, and being further configured to not transmit the data files;

wherein the processor is further programmed to write the decoded incoming data and files to the second storage device, and wherein the content of the data files is transmitted as HTML pages readable by a browser.

4. The computer according to claim 3, wherein the first and second host interface controllers are USB interface controllers.

* * * * *